United States Patent [19]

Rühle

[11] Patent Number: 4,924,114

[45] Date of Patent: May 8, 1990

[54] TEMPERATURE SENSOR

[75] Inventor: Wolfgang Rühle, Erlangen, Fed. Rep. of Germany

[73] Assignee: Siemens Aktiengesellschaft, Berlin & Munich, Fed. Rep. of Germany

[21] Appl. No.: 472,488

[22] Filed: Mar. 7, 1983

[30] Foreign Application Priority Data

Mar. 31, 1982 [DE] Fed. Rep. of Germany ....... 3212026

[51] Int. Cl.⁵ ........................ H01L 47/02; G01K 7/22
[52] U.S. Cl. ..................................... 307/310; 357/3; 357/28; 374/185
[58] Field of Search ........................ 357/16, 30, 61, 28, 357/22, 3; 307/310; 338/25, 22; 324/71.5; 374/185

[56] References Cited

U.S. PATENT DOCUMENTS

| | | | |
|---|---|---|---|
| 3,696,262 | 10/1972 | Antypas | 357/16 |
| 3,852,794 | 12/1974 | Pearson et al. | 357/3 |
| 3,994,755 | 12/1976 | Kamath et al. | 148/1.5 |
| 4,096,511 | 6/1978 | Gurnell et al. | 357/16 |
| 4,163,987 | 8/1979 | Kamath et al. | 357/30 |
| 4,165,471 | 8/1979 | Ahrenkeil | 357/30 |
| 4,531,217 | 7/1985 | Kitamura | 357/17 |

FOREIGN PATENT DOCUMENTS

| | | | |
|---|---|---|---|
| 2944015 | 5/1981 | Fed. Rep. of Germany | 357/28 |
| 52-36481 | 3/1977 | Japan | 357/3 |
| 838420 | 6/1981 | U.S.S.R. | 374/185 |

OTHER PUBLICATIONS

"Electron Transport and Band Structure of $Ga_{1-x}Al_xAs$ Alloys", H. J. Lee et al., Physical Review B, vol. 21, No. 2, Jan. 15, 1980, pp. 659–669.

Primary Examiner—William D. Larkins
Attorney, Agent, or Firm—Kenyon & Kenyon

[57] ABSTRACT

A temperature sensor having a semiconductor body is disclosed. The semiconductor body includes a substrate of a compound semiconductor and an epitaxial layer of a mixed crystal in which different conduction band minima with different effective masses are energy-wise closely adjacent. A particular embodiment comprises the mixed crystal series gallium-aluminum-arsenic having the composition $Ga_{1-x}Al_xAs$, in which the aluminum concentration is $0.2 \leq x \leq 0.43$. The temperature sensor formed in this manner provides a simplified design and a wide linear temperature range. Additionally, the temperature range is extended without the need for a shunt resistance.

4 Claims, 1 Drawing Sheet

TEMPERATURE SENSOR

BACKGROUND OF THE INVENTION

The present invention relates to a temperature sensor having a semiconductor body.

Sensors generally are designed to pick up events in a predominantly technical, although usually not electrical environment and to convert them into electrical signals. The idea of measuring temperature by determining the change in the conductivity of a solid body with temperature variation is connected with the origin of modern physics. This absolute measuring method has the advantage over the relative measurement of temperature by means of the Seebeck effect in that no reference temperature is necessary as, for example, with thermocouples. Temperature sensors which consist of a metallic resistor of nickel or platinum, for instance, are known and are characterized by high stability but also by relatively high manufacturing costs. The desire for an inexpensive temperature sensor led to the utilization of the advantages of silicon planar technology. However, sensors with a pn-junction are difficult to produce because of their space charge zone and the cutoff current, which are a function of temperature.

A temperature sensor is known from German O.S. 2944015 which is based on the principle of the spreading resistance and contains a semiconductor body of silicon, one flat side of which is provided with a layer of silicon dioxide. A metal contact makes connection via a highly doped zone with the semiconductor body through at least one window of the silicon dioxide layer. On the opposite flat side, the semiconductor body is provided with a metal carrier which forms, together with the metal contact, the two leads for the temperature sensor. The spreading-resistance temperature sensor contains no pn-junction. In the single silicon crystal, all the impurity atoms are ionized at normal temperature. An increase of the temperature is therefore not connected with an increase of the number of charge carriers and due to the reduction of the charge carrier mobility by phonon scattering, the conductivity decreases. This temperature sensor therefore has a positive temperature coefficient. The resistance as a function of the temperature is slightly exponential and can be linearized over a wide range, if desired, by connecting an ohmic resistance in parallel.

It is accordingly an object of the invention to improve upon the known temperature sensors of this type. In particular, it is an object of the present invention to provide a temperature sensor having an increased temperature range and a simplified design.

SUMMARY OF THE INVENTION

These and other objects of the present invention are achieved in a temperature sensor having a semiconductor body comprising a mixed crystal in which different conduction band minima with different effective masses are closely adjacent energy-wise. In a particular embodiment of the temperature sensor, the semiconductor body comprises a ternary or quaternary III-V compound semiconductor, for instance, gallium-aluminum-arsenic in the composition $Ga_{1-x}Al_xAs$ or gallium-arsenic-phosphorus with the composition $GaAs_{1-y}P_y$ as the ternary III-V compound semiconductor and, for instance, gallium-indium-arsenic-phosphorus with the composition $Ga_{1-x}In_xAs_{1-y}P_y$ as a quaternary III-V compound semiconductor.

A particularly advantageous further embodiment of the temperature sensor comprises a semiconductor body having a mixed crystal series gallium-aluminum-arsenic with the composition $Ga_{1-x}Al_xAs$, in which the aluminum concentration is $0.20 \leq x \leq 0.43$, or of the mixed crystal series gallium-arsenic-phosphorus with the composition $GaAs_{1-y}P_y$, in which the phosphorus concentration is $0.25 \leq y \leq 0.45$. With these mixed crystals, the design of the temperature sensor becomes particularly simple and the temperature range is increased toward high temperatures. A shunt resistor for linearizing is not necessary over quite large ranges.

BRIEF DESCRIPTION OF THE DRAWINGS

The invention will be described in further detail in the following detailed description with reference to the drawings, in which.

DETAILED DESCRIPTION

Figure 1:
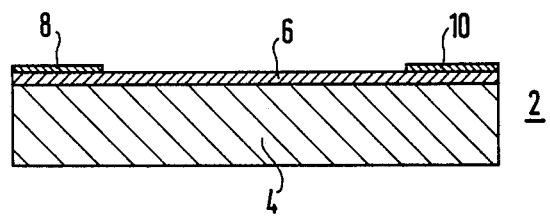
FIG. 1 is a longitudinal sectional view of the temperature sensor of the invention.

With reference now to the drawings, FIG. 1 shows an embodiment of a temperature sensor comprising a semiconductor body 2 having a semi-insulating gallium-arsenide substrate 4 which has a high resistance by means of doping substances, for instance, oxygen or chromium. On its top surface, an epitaxial layer 6 is grown which comprises the mixed crystal series gallium-aluminum-arsenic with the composition $Ga_{1-x}Al_xAs$. The aluminum concentration x may, for instance, be $0.2 \leq x \leq 0.43$. For measuring temperature in the temperature range of about 270° K. to 350° K., the aluminum concentration x is preferably 0.4; in particular, the aluminum concentration x is approximately 0.25 for measuring the temperature in the temperature range from 320° K. to 620° K. Contact-making is accomplished at the respective ends of the epitaxial layer 6 by ohmic contacts 8 and 10 which may comprise, for instance, gold-germanium alloys or several alloy layers, for example, a gold-germanium alloy, a nickel-chromium alloy and gold. The epitaxial layer 6 can also comprise a mixed crystal from the series gallium-arsenic-phosphorus with the composition $GaAs_{1-y}P_y$, in which the phosphorus concentration y is, for instance, $0.25 \leq y \leq 0.45$ and in particular, $0.3 \leq y \leq 0.35$. For measuring the temperature in the range from about 320° K. to 620° K. the phosphorus concentration can, in particular, be chosen as 0.33.

By using the mixed crystals $Ga_{1-x}Al_xAs$ or $GaAs_{1-y}P_y$ as the epitaxial layer 6, the resistance-temperature characteristic is a straight line over a wider range in which the resistance rises very steeply with temperature. This resistance-temperature characteristic, which is linear over a wide range, is caused by a change of the distribution of a nearly constant number of electrons between the direct Γ- and the indirect X- and L-minima, with mobilities which are respectively different. This temperature sensor with the mixed crystal as the semiconductor body can be used for the measurement of high temperatures up to, for instance, 770° K., because its intrinsic conductivity remains very low up to this temperature, due to the large energy gap. With the aluminum concentration x or the phosphorus concentration y, a predetermined temperature range can be set, in which the resistance-temperature characteristic is linear over wide ranges. This linearity is obtained without a shunt or series resistor.

Figure 2:
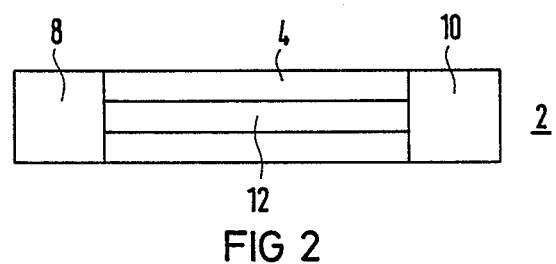
FIG. 2 is a top view of the temperature sensor of FIG. 1.

In FIG. 2, a top view of the temperature sensor is shown which has a resistance band 12 made by means of a photographic etching technique, for instance, and at each of its ends, the contact areas of the ohmic contacts 8 and 10 are formed on the epitaxial layer 6. The resistance band 12 is generally substantially longer than it is wide. It may, for instance, be about 10 μm wide and 100 μm long. In some circumstances it may be advantageous to make the dimensions substantially larger, for instance, a width of 100 μm and a length of about 2000 μm. The thickness of the resistance band 12 can be chosen for instance, 1 μm to 20 μm. The width of the ohmic contacts 8 and 10 is, for instance, about 50 μm to 500 μm. Using this design, large contact areas for the ohmic contacts 8 and 10 are obtained and accordingly, a correspondingly low contact resistance and a small, high-resistance band 12 can be produced. Influences on the measurement results which are caused, for instance, by connecting leads, are thus prevented.

Figure 3:
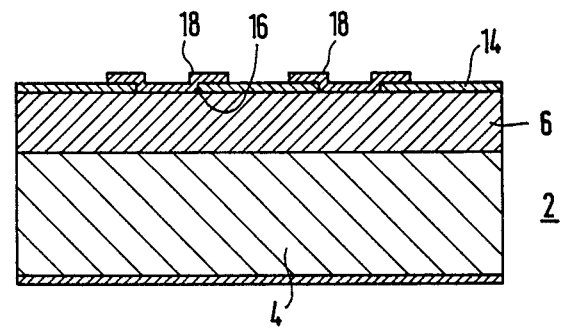
FIG. 3 is a longitudinal sectional view showing a further embodiment according to the principle of the spreading resistance.

In a particularly simple embodiment of the temperature sensor, the resistance band 12 may also extend over the entire width of the substrate. In FIG. 3, a further embodiment of the temperature sensor is shown which is designed in accordance with the principle of a spreading-resistance temperature sensor. The semiconductor body 2 preferably comprises a semi-insulating gallium-arsenide substrate 4 which is doped by means of doping substances, for instance, oxygen or chromium, and on the top side of which an epitaxial layer 6 has been grown which comprises a mixed crystal series gallium-aluminum-arsenic with the composition $Ga_{1-x}Al_xAs$. The aluminum concentration x may be, for instance $0.2 \leq x \leq 0.43$. On the top side of the epitaxial layer 6 an insulating layer 14 is provided which has at least one window 16 through which a metal contact 18 makes contact with the epitaxial layer 6. In this case the resistance, being a function of the temperature, is linear over a wide range of temperatures without an additional shunt resistance.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. The use of a mixed crystal of the mixed crystal series gallium-arsenic-phosphorus having the composition $GaAs_{1-y}P_y$ as a temperature sensitive material of a temperature sensitive resistor, said mixed crystal being arranged as an epitaxial layer on a substrate and the temperature dependent change of the resistivity of the resistor comprising said mixed crystal being caused by a change of the distribution of electrons between the minima of different conduction bands whose respective minima have minute energy differences and different effective masses and wherein the phosphorous concentration y in the mixed crystal ranges between 0.25 and 0.45 and the substrate comprises a compound semiconductor.

2. The use of a mixed crystal of the mixed crystal series gallium-arsenic-phosphorus recited in claim 1 wherein the substrate and the epitaxial layer comprise a spreading resistance.

3. The use of a mixed crystal of the mixed crystal series gallium-arsenic-phosphorus recited in claim 1 wherein the substrate is a semi-insulating substrate of GaAs and said epitaxial layer comprises a resistance band disposed on the substrate, said resistance band having a length and a width which is substantially narrower than said length.

4. The use of a mixed crystal of the mixed crystal series gallium-arsenic-phosphorus recited in claim 3, wherein the resistance band is provided at its ends with ohmic contacts, the width of said ohmic contacts being substantially larger than the width of the resistance band.

* * * * *